United States Patent [19]

Tikka

[11] Patent Number: 5,607,536
[45] Date of Patent: Mar. 4, 1997

[54] METHOD AND APPARATUS FOR COATING OBJECTS WITH A PLASTIC FILM

[75] Inventor: Raimo Tikka, Pori, Finland

[73] Assignee: Tikka-System Oy, Pori, Finland

[21] Appl. No.: 366,989

[22] Filed: Dec. 30, 1994

Related U.S. Application Data

[63] Continuation-in-part of Ser. No. 15,654, Feb. 9, 1993, abandoned.

[30] Foreign Application Priority Data

Oct. 30, 1992 [FI] Finland .................................. 924936

[51] Int. Cl.⁶ ........................... B29C 65/02; B29C 65/18; B32B 31/16
[52] U.S. Cl. ........................... 156/285; 156/321; 156/499
[58] Field of Search ...................... 156/285, 321, 156/391, 497, 499, 574

[56] References Cited

U.S. PATENT DOCUMENTS

| | | | |
|---|---|---|---|
| 3,608,016 | 9/1971 | Holmstrom | 264/89 |
| 3,697,369 | 10/1972 | Amberg | 156/321 |
| 4,104,101 | 8/1978 | Garabedian | 156/286 |
| 4,505,771 | 3/1985 | George | 156/556 |
| 4,505,774 | 3/1985 | Ariga | 156/556 |
| 4,838,973 | 6/1989 | Mentzer | 156/286 |
| 5,125,994 | 6/1992 | Harastu | 156/160 |
| 5,127,974 | 7/1992 | Tomiyama | 156/285 |

FOREIGN PATENT DOCUMENTS

| | | |
|---|---|---|
| 179374 | 5/1988 | European Pat. Off. . |
| 2240769 | 3/1973 | Germany . |
| 2745395 | 4/1978 | Germany . |
| 2917907 | 11/1979 | Germany ................ 156/321 |
| 3220416 | 12/1983 | Germany . |
| 3225533 | 1/1984 | Germany . |
| 3223171 | 1/1984 | Germany . |
| 3819434 | 12/1989 | Germany . |
| 2005191 | 4/1979 | United Kingdom . |
| 2134838 | 8/1984 | United Kingdom . |

OTHER PUBLICATIONS

Webster's II New Riverside Dictionary, The Riverside Publishing Co., Houghton Mifflin Co. (1984) p. 513.

Primary Examiner—Daniel J. Stemmer
Attorney, Agent, or Firm—Ladas & Parry

[57] ABSTRACT

A method and an apparatus for coating rigid objects made of wood or a wood fiber material with a plastic film. The plastic film is heated by a heating element emitting radiation of sufficient wavelength, whereby the temperature of the plastic film remains sufficiently low. After heating, the plastic film is lowered on the object to be coated a surface of which has been treated with a heat activatable adhesive. When the film touches the surface of the object, the adhesive is activated and adheres the film to the object. The adhesion is further enhanced by the sucking of air from between the object and the film.

16 Claims, 1 Drawing Sheet

METHOD AND APPARATUS FOR COATING OBJECTS WITH A PLASTIC FILM

This is a continuation-in-part application of U.S. patent application Ser. No. 08/015,654 filed Feb. 9, 1993 now abandoned.

FIELD OF THE INVENTION

The present invention relates to a method for coating rigid objects made of wood or a wood fiber material with a plastic film, said method comprising the steps of applying a heat activated adhesive on a surface of the object to be coated; heating the plastic film by a heat radiator spaced apart from the object to be coated; placing the plastic film on the object to be coated and causing the film to press against the surface of the object to be coated by sucking air from the space between the object and the plastic film until the film adheres to the surface of the object to be coated.

Further, the present invention relates to an apparatus for coating rigid objects made of wood or a wood fiber material with a plastic film, said apparatus comprising a heating hood defined by wall and top elements, a heat radiator provided in an upper part of the heating hood, and a low-pressure table for pressing the film to a surface of the object to be coated.

DESCRIPTION OF THE PRIOR ART

DE 38 19 434 teaches an arrangement in which a plastic film is heated in a heating chamber by means of rod-like heat radiators with a very high surface temperature, whereby the wavelength emitted by the heat radiator is very short. Further, on the bottom of the heating chamber there is a mould onto which the heated plastic film is pressed by overpressure applied from the side of the heat radiators, and sucked by low pressure applied correspondingly to the portion on the side of the mould. Said apparatus is a highly expensive and heavy arrangement. The overpressure in the heating chamber may rise to up to 10 bars, and the low pressure correspondingly approaches vacuum. This means that the walls of the heating chamber must be made very thick and firm. Opening of the heating chamber and handling of the final product which is removed from the surface of the mould is very difficult, because the thick walls of the heating chamber render the mass of the apparatus very large. Still further, the low and overpressure compressors required by the apparatus add to the total costs considerably. Since the wavelength of the heat radiation is very short and the heating process very fast, regulation of the heating process is very difficult. This causes non-uniform heating of the plastic film, and in the worst case, when the heat radiation is non-uniformly distributed, it burns holes in the plastic film, whereby the object in question will be discarded from the line.

DE 32 20 416, DE 32 23 171 and DE 32 25 533 disclose an apparatus and further applications of said apparatus in which a plastic material is heated by rod-like heat radiators with a very high surface temperature. The heated plastic sheet is placed on a mould, after which it is pressed against the mould by low pressure or overpressure. When the plastic sheet thus moulded has cooled down, it is detached from the mould for further treatment. It should be noted that said apparatus is not used for coating a material, but for moulding required objects from a plastic material. Said DE publications disclose how the plastic material is moulded industrially, and the production line is developed for industrial use. In addition, for its rapidity the heating process is very difficult to regulate, and because of the difficulty in the regulation, a uniform heating of the plastic material is practically impossible.

DE 27 45 395 discloses an apparatus in which the heated plastic material is forced into the shape of the mould by low pressure, and after the moulding product is detached from the mould. The document also discloses a mould recycling system, which makes the production easy and flexible.

EP 179,374 teaches an apparatus with which different rubber surfaces may be vulcanized with one another in their mould and possibly e.g. car tires coated. The solution of the publication concerns only the treatment of a rubber material.

DE 22 40 769 discloses an apparatus in which, by using over and low pressure the coating is moulded into the shape of the mould, after which a resilient material such as polyurethane is injected between the coating and the mould whereby said apparatus may be used e.g. for manufacturing padding for car seats. Said document further describes an apparatus with which the production of such products may be industrialized to meet the requirements of the automobile industry.

GB 2 005 191 discloses coating of a sound and heat insulator made of a sparse and porous insulation material with a vinyl film. A liquid adhesive is applied on the surface of the insulation material. The -plastic film is heated to a temperature in the range of 320° to 350° F. (160° to 176°.C.) by means of a convection or infrared oven. A temperature as high as this is necessary in order to fuse the adhesive to form a solid. Thereafter the plastic film is sucked onto the insulation material, whereby the porous insulation material is compressed by about 15%. However a convection or infrared oven heats the plastic film unevenly. With the wool sheets employed in the cited reference, it is possible to use even hot plastic films, but in the coating of rigid structural elements plastic films as hot as this cannot be used. Moreover, it is not possible to use a liquid adhesive, in the coating of rigid structural elements, because such an adhesive stops the slot between the object and the plastic film, whereby it is impossible to suck away all air from between the object and the plastic film.

U.S. Pat. No. 5,127,974 discloses three different ways of coating an automobile against outer corrosion during transportation etc. In the first method, a plastic film is adhered to the automobile by pressing mechanically, one side of the plastic film comprising releasable adhesive or the like. In this method, no heat or the like is used, but this is a solution of contact plastic type only. The reference further discloses a solution in which a heat-shrinkable plastic film is adhered to the edges of an automobile body by means of releasable adhesive by pressing the plastic film to the edges of the body and by shrinking the plastic film after that by heating it with an infrared heater. The third solution disclosed in the cited reference is a method in which a heat-shrinkable plastic film is sucked by underpressure around an automobile while the film is heated by an infrared heater so that the film can be fixed tightly to the surface of the automobile. In this method, no adhesive or fixing agent whatsoever is used. In this reference, the applicant considers the three different methods equal, the first one comprising mechanical adhering by a releasable adhesive, the second one comprising adhering a film at its edges and shrinking it by heating, and the third one comprising merely sucking and heating the film so that it presses against the surface. In all these solutions, a plastic film is adhered to the surface of an automobile only temporarily; the film thus provides temporary protection on top of the actual surface of the automobile. In other words the plastic film can easily be removed from the surface of the automobile.

SUMMARY OF THE INVENTION

The object of this invention is to provide a method and apparatus enabling the coating of rigid objects made of a wood or wood fiber material with plastic film and providing for a lightweight apparatus. This is achieved with the method of the invention, which is characterized in that the plastic film is heated by a planar heating element essentially having the size of that surface of the plastic film which is to be heated, the adhesive on the surface of the object to be coated being activated by the heated plastic film, and the heated plastic film adheres to the object to be coated.

The apparatus of the invention is further characterized in that the heat radiator heating the plastic film is a planar heating element essentially having the size of that surface of the plastic film which is to be heated.

The essential concept of the invention is that the surface temperature of the heat radiators heating the plastic film is so low that the wavelength generated by the radiator is long enough, whereby the heat radiation absorbing factor of the plastic film is very good. Thereby the plastic film is uniformly heated throughout. The heating hood is provided with an inner surface that absorbs as little heat radiation as possible whereby it reflects the heat radiation to the object desired, in this case to the plastic film. A preferred embodiment is to make the surface of the heat elements facing the plastic film from a substance which emits heat radiation well and, correspondingly, the surface of the heat elements not facing the plastic film from a substance which emits heat radiation poorly, whereby the heat radiation can be directed straight to the plastic film. Another embodiment provides the highest point of the heating hood with a ventilating hole or ventilating holes enabling change of air heated by the heating elements when the plastic film is not attached to the heating hood. Still another embodiment is that in the heating phase the plastic film adheres to the hood at the edges of the hood by the effect of low pressure, whereafter the heating elements heat the plastic film and after this the heated plastic film is transferred onto a rigid structural object whereby the object need not be heated. An example of a rigid structural object is a door. After this the plastic film is sucked tightly onto the object by low pressure so as to adhere to the whole area to be coated. The plastic film forms the outer surface of the finished product. Furthermore, the surface of the object is treated so that, by the effect of heat, it enables adhesion of the heated plastic film to the surface of the object. Yet another concept is that the temperature of the plastic film does not exceed 140° C. at any stage. Furthermore, the adhesive that is used may not be in liquid form when the plastic film is placed on the object to be coated.

An essential advantage of the invention that when the plastic film is heated at a lower temperature, the heat is more uniformly distributed in the plastic film and will thus not burn holes in the film or cause excessive stretching thereof. When a lower temperature is used for heating the plastic film, it is possible to adjust the temperature of the plastic film to be uniform and ensure an accurate temperature for it. Another essential advantage is that the heating hood can be made very light and thus easily movable, because the hood need not be pressurized. Since the walls of the heating hood are made from a material which absorbs heat radiation poorly, the hood reflects the heat radiation uniformly on the plastic film. It is also to be noted that said device heats only the plastic film and not the object to which the plastic film is attached. Distortions of the objects are thus avoided. One advantage is that, as the temperature of the plastic film is kept low, it is also possible to use embossed, decorative plastic films for the coating, and the object to be coated is not damaged by the action of heat. In addition, the use of a non-liquid adhesive allows all air to be sucked away by means of low pressure from between the plastic film and the object to be coated.

BRIEF DESCRIPTION OF THE DRAWINGS

The invention will be described in greater detail with reference to the attached figures.

DETAILED DESCRIPTION OF THE INVENTION

Figure 1:
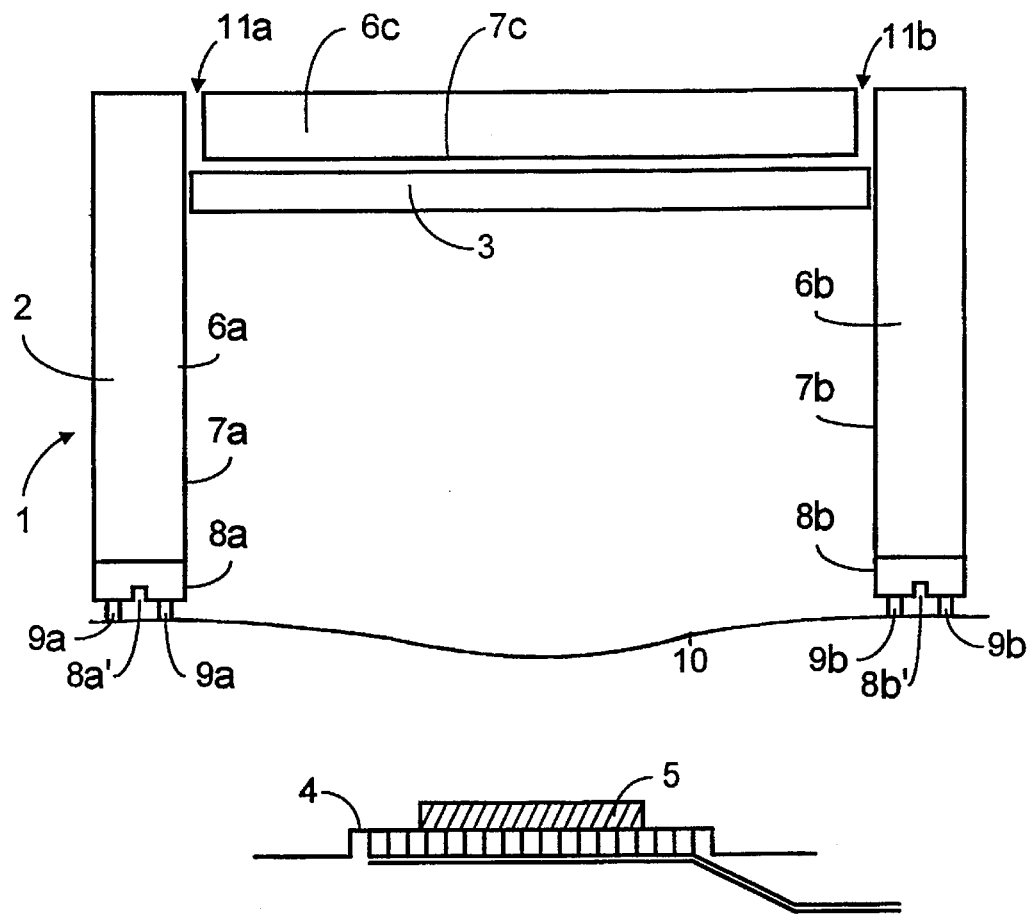
FIG. 1 is a side view of an apparatus of the invention.

FIG. 1 shows an apparatus 1 for heating plastic films, said apparatus comprising a heating hood 2, heating elements 3, a low-pressure table 4 and an object 5 to be coated, said object being located on the low-pressure table 4. The object 5 is a rigid structural object, such as a door, wall panel, table board, or some other semi-finished product made of a wood or wood fiber material e.g. a box blank or the like. The wood fiber material may be a board of plywood made from a veneer-like sheet by gluing, a chipboard made of fibers and glue by compressing a hardboard, or the like. The surface of the object may be provided with various grooves or, correspondingly, with embossings. The embossed figures may also be loose, in which case the plastic film placed on the object to be coated fixes them to the object. Examples of types of films that can be used in this invention are polyvinyl chloride (PVC) films and Semirigid HT which is available from a Finnish company KVH PLAST LTD.

The heating hood 2 comprises wall elements 6a and 6b and a top element 6c. The wall and top elements 6a–6c are made so that inner surfaces 7a, 7b and 7c are made from a material which absorbs heat radiation as little as possible, such as a burnished aluminum sheet. On the inner surface there is provided a heat-insulating layer which prevents unnecessary heat distribution to the environment. The wall elements 6a and 6b comprise a low-pressure portion 8a and 8b with grooves 8a' and 8b' and sealings 9a and 9b. Further, FIG. 1 shows a PVC plastic film 10 and ventilating holes 11a and 11b. In a situation in which the PVC plastic film 10 is not attached to the heating hood 2, hot air heated by the heating elements 3 within the heating hood 2 can flow out through the ventilating holes 11a and 11b, whereby, when a new PVC plastic film is being attached to the heating hood 2 by means of the low-pressure grooves 8a' and 8b' no excessive heated air remains in the heating hood which possibly burns holes in the PVC plastic film 10. When the film 10 is attached to the heating hood 2 by means of the low-pressure portions 8a and 8b, there is no air flow through the ventilating holes 11a and 11b. When the film 10 is sufficiently warm, it is lowered onto the low-pressure table 4 and the object 5 to be coated. The surface of the object 5 is treated with an adhesive which is activated by heat, whereby, when the hot film 10 touches the adhesive, it makes the adhesive capable of adhesion for a moment. An example of a heat activatable adhesive that is suitable for use in this method is Kestofol SV supplied by the Finnish company Kiilto Oy. When the adhesive cools down, the film 10 starts to adhere, whereby a solid coating is formed on the object.

The plastic film 10 is heated to a maximum temperature of 140° C. to prevent the surface of the plastic film from being damaged, and to prevent the heated plastic film 10 from damaging the object 5 to be coated. Temperature sensors can be attached to or against the plastic film in order to measure temperature of the plastic film, whereby the temperature of the heat radiators and the heating time can be adjusted so that the temperature of the plastic film does not exceed 140° C. The temperature of the object to be coated can also be measured. It is sufficient to make the measurements only once (when the first object is being coated) and if the type and the thickness of the plastic film remain unchanged, the temperature of the heat radiators and the heating time can be unchanged. If the temperature is not measured the surface of the plastic film can be observed and if there is damage after the heating to the surface of the plastic film, the temperature of the heat radiators can be lowered and/or the heating time can be shortened. The changing of temperature of the heat radiators and heating time are within the skill of a person of the art. For example, when the surface temperature of the heat radiators heating the plastic film is so low and the heat radiation absorbing factor of the plastic film is good, the plastic film will be uniformly heated throughout.

The excessive heated air is vented through the ventilating holes before attaching a new plastic film. If excessive heated air remains in the heating hood it would burn holes in the plastic film.

In order to make the film press against the object 5 as efficiently as possible, air is sucked from under the film by the low-pressure table 4, whereby the atmospheric pressure presses the film 10 as tightly as possible against the object 5 to be coated. As shown in FIG. 1, the low-pressure table 4 is sufficient in size to cause suction at least around the periphery of the object 5. The use of a heat-activatable adhesive which is in solid form, forms a substantially evenly rough surface and when the plastic film 10 is placed on the object 5, this allows all air to be sucked away from between the plastic film 10 and the object 5. Since the object 5 to be coated, i.e. a rigid structural element, has a relatively high heat capacity, the temperature of the plastic film 10 falls quite rapidly; the plastic film 10 must therefore be rapidly sucked onto the object 5 in order to allow the plastic film 10 to conform accurately to the surface of the object 5 before cooling down. In the tests conducted, it has been found that the adherence must typically take place in less than five seconds. In practice, however, the best result has been achieved when this time has been less than three seconds. Such rapid adherence is preferably effected in such a manner that vacuum is stored in advance in containers having a large volume, preferably at least thirty times the amount of the air to be sucked from under the film; during adherence, the air is sucked from between the object 5 and the plastic film 10 into these containers. If it is to be ensured that the adhesive is activated throughout, the heating can be continued after the fixing of the plastic film. Even in this case, the heating time is adjusted so that the temperature of the plastic film does not exceed 140° C. In addition, the temperature of the heater and the heating time are adjusted so that the temperature of the object to be coated does not exceed 100° C.

Figure 2:
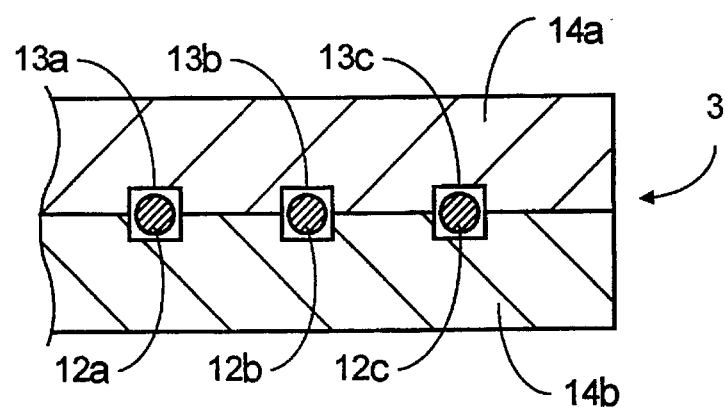
FIG. 2 shows the cross-section of a preferred heating element.

FIG. 2 shows by way of example a preferred apparatus according to the heating element 3, said apparatus comprising heating resistors 12a–12c and two mutually corresponding members 14a and 14b having grooves 13a–13c of a square cross-section cut therein for the resistors 12a–12c.

Further, the surfaces of the members 14a and 14b have been treated in such a manner that the half with its surface facing the plastic film 10 is made to emit heat radiation well, having typically been painted black, and, correspondingly, the other surface, not facing the plastic film 10, is made to emit heat radiation poorly, i.e. in practice this means that it is left bright. In this case the heat radiation is directed straight to the plastic film 10. Further, the heating element halves 14a and 14b may preferably be made from aluminum, which has a very good heat transfer capacity, whereby, with the resistors 12a–12c becoming hot, the heat is distributed as uniformly as possible in the halves 14a and 14b. It should however be noted that it is mainly one surface which emits heat radiation from the heating element 3, whereby the radiation occurs only through the desired surface. Most preferably the temperature used is 200° to 300° C. whereby the wavelength of the heat radiation is greater than 4 μm but less than 10 μm. The heating element may also be of the type of heat exchanger, whereby e.g. hot oil may be led to the heating element, said oil having been heated outside the heating hood and led, after heating along the piping to the heating element. Further, other liquids may be used as a medium in the heat transfer. The surface of the heating element may be so formed as to have a serrated cross-section, whereby the heat radiation moves through the coating of the wall elements by being reflected to the plastic film. It is however to be taken into account that the heating element is a planar sheet with an essentially straight surface, whereby the heat radiation is uniform.

It should be noted that this method is easy to bring into production, because the required length of film may be pulled under the heating hood from the roll, whereafter the film is heated, and after the object to be coated is moved onto the low-pressure table 4. This makes the process fast and efficient.

The figures and the descriptions related thereto are intended merely to illustrate the concept of the invention, and in its details the invention may vary within the scope of the claims. Therefore, in some cases the heating element may be an aluminum sheet on which the heating resistors are provided. The essential concept is however that the surface temperature of the heat-emitting object is sufficiently low. It is still to be noted that FIG. 1 is only a cross-section of the apparatus in question and that in reality the apparatus is a three-dimensional apparatus which takes account of depth also, whereby, when looked at from the corner, the apparatus resembles a cube. The heating element is schematically depicted as one piece in the figure, but it can be formed of a plurality of planar element portions so that together they form a planar radiator essentially having the size of that surface of the plastic film which is to be heated.

I claim:

1. A method for coating a rigid object made of wood or a wood-fiber material with a plastic film having a surface that is damaged at temperatures above 140° C., the method comprising a) applying a solid, heat-activatable adhesive to a surface of the rigid object so that the solid adhesive forms a rough surface on the object; said adhesive being activatable by heat at a heat activation temperature below 140° C.;

b) uniformly heating the surface of the plastic film to a heating temperature above the heat activation temperature but not above 140° C.;

c) placing the heated plastic film over the rough surface so that there is an air space between the rough surface and the heated plastic film and creating a low pressure area below the object to cause suction at least around a periphery of the object, said low-pressure area being of sufficient size such that the suction at least around the periphery is sufficient to remove substantially all air from between the rough surface and the heated plastic film, said heated plastic film causing the adhesive to melt and said suction causing the plastic film to conform to the surface of the object whereby the film adheres to and forms a surface of the object.

2. A method as claimed in claim 1, wherein a low-pressure table is used to suck the air from at least around the periphery of the object, said low-pressure table creating sufficient suction at least around the periphery to cause the heated film to conform to the surface of the object before the heated film cools down below the heat activation temperature of the adhesive.

3. A method as claimed in claim 1 wherein a heating radiator is used for the heating in step (b), said heat radiator comprising a heating element, a top element and wall elements, said plastic film being placed against a lower edge of the wall elements during the heating.

4. A method according to claim 3, wherein heated air in a space defined by the wall and top elements is vented through ventilation ducts in the top element when the plastic film is not positioned against the lower edge of the wall elements, and wherein heated air in the space defined by the wall and top elements is not vented through the ventilation ducts when the plastic film is positioned against the lower edge of the wall elements.

5. A method according to claim 3, further comprising:

attaching temperature sensors to the plastic film to measure a temperature of the plastic film, and adjusting a period of time for heating and a temperature of the heat radiator so that the temperature of the plastic film does not exceed 140° C.

6. A method according to claim 5, wherein the plastic film is heated further after the plastic film has been placed on the rough surface, the heating time and the temperature of the heat radiator being adjusted so that the temperature of the plastic film does not exceed 140° C.

7. A method according to claim 6, wherein the period of time for heating and the temperature of the heater are adjusted so that the temperature of the rigid object does not exceed 100° C.

8. A method according to claim 5, wherein the period of time for heating and the temperature of the heat radiant are adjusted so that the temperature of the rigid object does not exceed 100° C.

9. A method according to claim 3, wherein a first surface of the heating element is painted so that it emits radiation well.

10. A method according to claim 9, wherein the first surface of the heating element is painted black, a second surface of the heating element being bright.

11. A method according to claim 3, wherein a period of time for heating in step (b) and a temperature of the heat radiator are adjusted so that the temperature of the rigid object does not exceed 100° C.

12. A method according to claim 3, wherein the plastic film placed against the lower edge of the wall elements is supported during heating by sucking air through channels provided in the wall elements so that the plastic film presses against the lower edge of the wall elements.

13. A method according to claim 3, wherein the suction in step (c) is sufficient to cause the plastic film to conform to the surface of the rigid object in less than three seconds.

14. A method according to claim 13, wherein a low-pressure table is used to suck the air from between the rough surface and the heated plastic film, the air being sucked into containers having a vacuum and a volume, the volume of the containers being at least thirty times the volume of the air being sucked from between the rough surface and the heated plastic film.

15. A method according to claim 1, wherein the suction in step (c) is sufficient to cause the plastic film to conform to the surface of the rigid object in less than five seconds.

16. A method according to claim 15, wherein a low-pressure table is used to suck the air from between the rough surface and the heated plastic film, the air being sucked into containers having a vacuum and a volume, the volume of the containers being at least thirty times the volume of the air being sucked from between the rough surface and the heated plastic film.

* * * * *